T. URIE.

Shaft-Couplings for Earth-Augers.

No. 139,092. Patented May 20, 1873.

Witnesses
A Bennerkendorf.
E. Sedgwick.

Inventor.
T Urie
Munn & Co
Attys

UNITED STATES PATENT OFFICE.

THOMAS URIE, OF CORNING, IOWA.

IMPROVEMENT IN SHAFT-COUPLINGS FOR EARTH-AUGERS.

Specification forming part of Letters Patent No. 139,092, dated May 20, 1873; application filed September 7, 1872.

*To all whom it may concern:*

Be it known that I, THOMAS URIE, of Corning, in the county of Adams and State of Iowa, have invented a new and useful Improvement in Well-Boring Shafts; and I do hereby declare that the following is a full, clear, and exact description of the same, reference being had to the accompanying drawing forming a part of this specification, in which—

Figure 1:
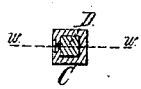
Figure 2:
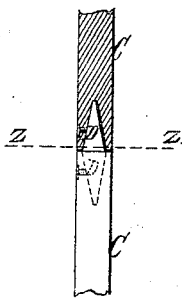

Figure 1 is a cross-section of the coupling through the line $z\ z$, Fig. 2. Fig. 2 is a side view of the coupling, partly in vertical section, through the line $w\ w$, Fig. 1.

My invention has for its object to furnish an improved shaft-coupling for well-borers and other machinery, as hereinafter more fully described.

The shaft C is made square, and in sections or lengths. Upon the lower end of the lower section is formed, or to it is attached, a boring-tool. In each end of each section or length of the shaft C is formed a tapering square hole or socket to receive the coupling-pin D, which is made square in its cross-section, and tapering from its center toward each end, to correspond with and fit snugly into the holes or sockets in the ends of the sections of the shaft C, where it is secured in place by set-screws, as shown in Figs. 3 and 4. This construction leaves the surface of the shaft C smooth throughout its entire length.

Having thus described my invention, what I claim is—

The coupling-pin D and sections of the shaft C, combined and relatively constructed substantially as herein shown and described, and for the purposes set forth.

THOMAS URIE.

Witnesses:
GEORGE E. CROW,
THOMAS GEORGE.